United States Patent Office

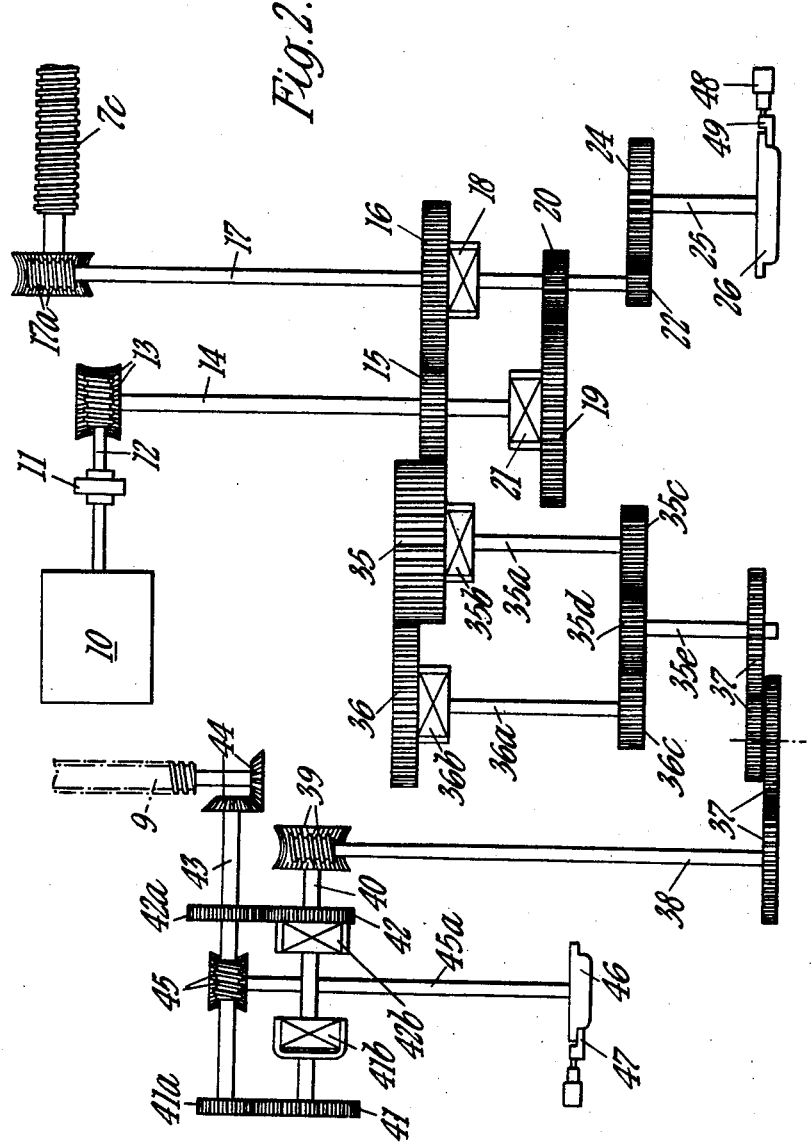

3,143,039
Patented Aug. 4, 1964

3,143,039
METHOD FOR FINISHING GEARS
John Alfred Mills, 24 Kingsley Ave.,
Newcastle-upon-Tyne, England
Filed Jan. 31, 1961, Ser. No. 86,032
Claims priority, application Great Britain June 7, 1960
14 Claims. (Cl. 90—1.6)

This invention has reference to the method of shaving gear members which consists in mating the gear member to be shaved with a rotary shaving cutter member, rotating one of said members thereby driving the other member through the intermeshing engagement of the teeth of the two members, the axes of the members being crossed at an angle of at least 3° and less than 30° and imparting relative traverse of one member relative to the other in a plane which is parallel to the axes of both. The direction of relative traverse of the intermeshing members may be parallel to the axis of the gear member, that is conventional gear shaving, or the direction of traverse may be inclined to the axis of the gear member, that is diagonal gear shaving.

Heretofore in finishing gears by this method the passes, or traverses of the gear member relative to the tool member, have been made at a constant rate, with incremental in-feed for each pass except the last pass or last few passes by which a final finish is imparted to the gear. By in-feed is meant the feed of the tool member relative to the gear member which results in their axes being moved towards each other, such feed being accomplished in small increments. The feed rate of each pass is generally such that the travel of the crossed axes along the gear member is of the order of 0.010" per revolution of the gear member measured in the direction of the axis of the gear member and the feed rate of the table carrying the gear member or tool member must be chosen to produce such rate of travel, due regard being given to the direction of traverse of the gear member relative to the tool member. It is found that if such feed rate is substantially higher than 0.010" per revolution of the gear member the surface finish and accuracy of the shaved teeth deteriorates. Thus in finishing gears by the method set forth in accordance with the present practice the said feed rate constitutes a major factor in determining the time taken to finish a gear member.

One object of the present invention is to provide improvements in the aforesaid method of shaving gear members whereby the speed of the whole finishing cycle can be increased without deterioration of the final finish and accuracy imparted to the gear member.

Another object of the invention is to provide improvements in the aforesaid method of shaving gear members by which a better finish can be obtained to the gear members without reduction in output.

According to the present invention gear members are shaved by the method comprising mating the gear member to be shaved with a rotary shaving cutter member, rotating one of said members thereby driving the other member through the intermeshing engagement of the teeth of the two members, the axes of the gear member and cutter member being crossed at an angle of at least 3° and less than 30°, imparting relative traverse of one member relative to the other in a plane which is parallel to the axes of both so as to make at least two passes, at least the initial pass being made at a relatively high rate of feed and at least the final pass being made at a relatively low rate of feed, the ratio of the high rate of feed to the low rate of feed being of the order of between 1.25 and 3 to 1.

The direction of relative traverse of the intermeshing members may be parallel to the axis of the gear member or may be inclined to the axis of said member.

Incremental in-feed may be applied between the gear member and the tool member at the end of at least the initial pass.

The gear shaving cycle may consist of two passes of the gear member relative to the tool member, the first pass being made at the relatively high rate of feed and the second pass at the relatively low rate of feed. The final pass may be made with or without incremental in-feed between the gear and tool members.

Alternatively only one pass of the gear member relative to the tool member may be made at the relatively high speed followed by a plurality of passes at the relatively low speed without incremental in-feed between the gear member and tool member. Or a single pass may be made at the high rate of feed followed by at least one pass at a relatively low rate of feed and accompanied with incremental in-feed between the tool member and gear member and thereafter at least one pass at the lower rate of feed without incremental in-feed between the tool member and gear member.

The pass or passes at the higher rate of feed should be effected at a feed rate greater than the conventional feed rate of the order of 0.010" per revolution of the gear member, this feed rate being the rate of traverse of the crossed axis point along the axis of the gear member.

The invention also consists in a machine for finishing gear members having means for rotatably supporting the gear member to be finished, a rotary shaving cutter member meshing with the gear member, means to rotate one of said members thereby driving the other member through the intermeshing of the teeth, the axes of the gear and cutting tool being crossed, and means for imparting relative traverse of the one member relative to the other, said means including gearing by which the said traverses are effected at two rates of speed as measured along the axis of the gear, and means for automatically operating said gear at the end of the traverse so that the speed rate is changed from a relatively high to a relatively low rate during the gear shaving operation.

The invention will now be described with reference to the accompanying drawings wherein—

FIGURE 2 shows diagrammatically a preferred mechanism for effecting the up-feed and for effecting the traverse or passes of the gear relative to the tool in accordance with the present invention.

Figure 1:
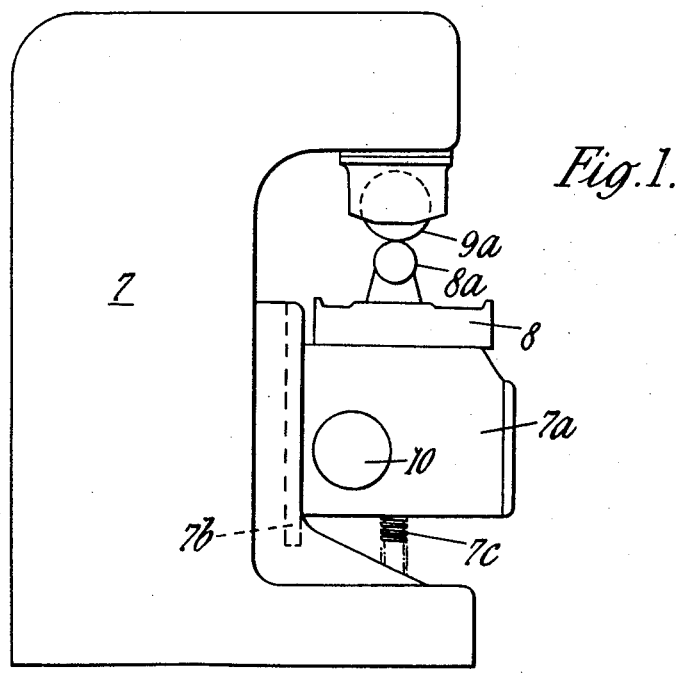
FIGURE 1 is a side elevation of a gear shaving machine.

As shown in the drawings the gear shaving machine is provided with a frame 7 on which is mounted a knee 7a vertically adjustable on ways 7b by means of an up-feed screw 7c. Supported by the knee is the gear support table 8 which carries stocks by which the gear to be finished, and designated 8a, is freely rotatably supported. The gear support table 8 is mounted on the knee and is traversed in any desired path by means of a feed screw 9, see FIGURE 2. In preference the means for traversing the table in any desired direction is as set forth in my co-pending patent application No. 23,507, dated April 20, 1960, now Patent No. 3,069,977, but any other means may be provided to traverse the table for either conventional or diagonal gear shaving.

Surmounting the table and carried by a forwardly projecting part of the machine is a power driven tool 9a, the tool and gear having conjugate teeth.

The two feed screws 7c and 9 are driven by means of a single reversible motor 10 mounted on the knee 7a.

The means by which the vertical feed screw 7c is driven will first be described, such means being substantially similar to that set forth in my copending patent application No. 37,249, dated June 20, 1960.

The motor 10 drives a transmission shaft 12 which by worm and worm-wheel gearing 13 drives a first shaft 14 having keyed thereon a first gear wheel 15. This wheel meshes with a gear wheel 16 free on a second shaft 17 parallel with the first shaft. The shaft 17 drives the feed screw 7c through a worm and worm-wheel drive 17a. Shaft 17 carries an electromagnetic clutch 18 which, when energized, locks the gear wheel 16 thereon so that the drive is then transmitted to the second shaft through the intermeshing gear wheels 15 and 16. Said gear wheels are such as will transmit a low speed up-feed.

Loose on the first shaft 14 is a further gear wheel 19 which meshes with a gear wheel 20 keyed on the second shaft 17, said intermeshing gear wheels being such as will transmit a relatively high speed transmission to the second shaft 17 and thereby a fast up-feed. Also on the first shaft is an electro-magnetic clutch 21 which, when energized, locks its freely running gear wheel 19 to its shaft.

It will be seen that with the motor running and with neither clutch energized no drive is transmitted to the vertical feed screw 7c. When the clutch 18 is energised the slow up-feed to the knee is transmitted through intermeshing gears 15 and 16 and when clutch 21 is energised the up-feed is relatively fast, the drive to the feed screw 7c being transmitted through the intermeshing gears 19 and 20. It will also be seen that by reversing the motor and energizing the clutch 21 the knee can be moved quickly downwards.

The shaft 17 has also fast thereon a gear wheel 22 which meshes with a relatively large gear wheel 24 fast on a short shaft 25 on which is secured a disc 26. This disc will always rotate when the table is being raised and lowered and will occupy a definite rotational position corresponding to the vertical position of the knee. The disc is provided near its periphery with a T slot in which are fitted trip dogs arranged to co-operate with microswitches, the function and arrangement of the trip dogs and switches being hereafter described.

The means by which the traverse feed screw 9 is driven will now be described.

The aforesaid gear wheel 15 which is keyed to the shaft 14 meshes with the first of two intermeshing and similar gear wheels 35 and 36 loose on their respective shafts 35a and 36a and on said shafts are electro-magnetic clutches 35b and 36b respectively which, when energized, lock the respective gear wheel to its shaft so that the latter is driven thereby. Said shafts have fast thereon gear wheels 35c and 36c which intermesh with a gear wheel 35d fast on a short shaft 35e to the foot of which is fast the first of a series of intermeshing gear wheels 37, the last of which is fast on a shaft 38.

This shaft through a worm and worm-wheel gearing 39 drives a shaft 40 on which are freely mounted two spur wheels 41 and 42 which mesh respectively with spur wheels 41a and 42a fast on a shaft 43. Shaft 43 through bevel gearing 44 drives the feed screw 9.

The intermeshing spur wheels 41 and 41a are change gears for selecting the ratio of the two feeds and are such that they rotate the feed screw 9 to give a high rate of traverse to the table and the intermeshing spur wheels 42 and 42a are such that they rotate said feed screw to give a relatively slow rate of traverse to the table. The speed ratio should be of the order of between 1.25 and 3 to 1.

Further, shaft 43 through a worm and worm-wheel gearing 45 drives a shaft 45a on which is secured a disc 46. This disc has a circumferential T slot in which are fitted trip dogs only one of which is shown and which is designated 47. Said trip dogs co-operate with a reversible micro-switch by which the forward and reverse clutches 35b and 36b are energized. Said disc also carries a trip dog which operates an over-travel limit switch.

It will be appreciated that said disc 46 is rotated in one direction in synchronism with the forward traverse stroke of the table and in the other direction in synchronism therewith during the reverse stroke. The first of said micro-switches fulfills a double function. When contacted it reverses the traverse of the table and it energises the clutch 18 to initiate a slow up-feed increment.

The two electro-magnetic clutches 41b and 42b are selectively energized and de-energised by the operation of switches which are closed and opened by means of trip dogs adjustably positioned on and carried by the disc 26. Only one of said switches and one of said trip dogs, designated 48 and 49 respectively, are shown in FIGURE 2.

The machine above described, apart from the means controlling the fast and slow traverse of the table, operates as set forth in my said co-pending application No. 37,249. That is, the up-feed screw 7c and the traverse feed screw 9 are both driven by the reversible motor 10. The clutch 21 is energized so as to give an initial quick up-feed through the gearing 19 and 20 and the clutch 18 is energized thereafter to give a series of relatively slow up-feed increments through the gearing 15 and 16, the energising of the two clutches being controlled by switches operated by trip dogs carried by the discs 26.

The traverse feed screw is driven through clutches 35b and 36b alternately and through the transmission gear described, said clutches being alternately energized by a reversing switch actuated by trip dogs carried by the disc 46.

During the traverse of the table following each up-feed increment or a number of such traverses the clutch 41b is energised so that the drive from the motor to the feed screw 9 is through the spur wheels 41 and 41a to give a relatively quick traverse to the table. Thereafter the clutch 41b is de-energised and clutch 42b is energised so that the drive to the feed screw 9 is now through the gears 42 and 42a to give a relatively slow traverse. The feed screw is not rotated or is rotated to give very small increments of up-feed when the table is traversed at its slow speed.

In setting the machine trip dogs on the disc 26 are adjusted in accordance with the number and the extent of the feed increments desired and the trip dog 49 is adjusted so that after a predetermined number of traverses or passes of the table the clutch 41b is de-energized and the clutch 42b energised so that the table is then traversed at its slower speed through the spur wheels 42 and 42a with little or no up-feed increments.

When the machine is set to give the desired number of in-feed increments and to give the desired number of passes or traverses at the relatively high speed followed by one or more passes at the relatively slow speed the motor is set in operation so that the table is initially raised quickly and thereafter raised to give the desired number of up-feed increments. The table is also traversed with the tool and gear in mesh, the traverse being first in one direction and then in the other. The traverse is initially at the higher speed and after the predetermined number of traverses the traverse is at the lower speed. According to the setting of the machine the traverse at the slower speed is accompanied with or without infeed and the number thereof is such as will give the desired finish and accuracy to the gear. In certain cases only one such slow traverse will be required, and in other cases two traverses at the lower speed will be required to provide the final finish and accuracy. There may be no in-feed during the final finishing traverse or there may be very small increments.

As an example of finishing gears by the improved method the gear can be shaved or finished in six passes, the first four passes being accompanied with up-feed at a high feed rate, say 0.018" per revolution of the gear. At the end of the fourth pass, when the up-feed is now complete, the finish will be inferior to that which would be obtained if the passes were at the conventional rate of feed, i.e. of the order of 0.010" per revolution of the gear, but the finish will be brought to the necessary standard by the following two finishing passes executed without up-feed at a lower feed rate, e.g. 0.010" per revolution of the gear.

In accordance with another example of finishing gears in accordance with the invention the gear is finished in four passes the first two passes being accompanied with up-feed and at the higher rate of feed, the third pass with a small up-feed at the relatively slow rate of feed and the fourth pass without up-feed and also at the relatively slow rate of feed.

The number of passes at the high speed and the number at the low speed may be varied as found desirable and there may be no incremental in-feed or there may be incremental in-feed after any one or more passes likewise as may be found desirable.

In finishing by the usual method with uniform rate of traverse under which there are four traverses each stroke may take 10 seconds so that the complete cycle occurs in 40 seconds. By the present invention likewise moving four strokes the first and second strokes may each be effected in 5 seconds and the third and fourth strokes each in 10 seconds. Therefore, the complete cycle of operations for each gear takes 30 seconds, this representing an increase of about 33% in output.

Or alternatively, the first and second strokes each take 8 seconds and the third and fourth strokes may each take 12 seconds. Thus the time taken is 40 seconds which is the same time as by the usual method. By reason, however, of the relatively slow third and fourth traverses a better finishing is obtained.

In a further alternative the first and second traverses may each be effected in 5 seconds and the third and fourth strokes each effected in 12 seconds which means that the cycle of operations is completed in 34 seconds. Here again an increased output is obtained and in addition, by reason of the relatively slow third and fourth traverses, a better finishing is imparted to the gears.

What I claim is:

1. A method of shaving gear members comprising mating the gear to be shaved with a rotary shaving cutter member, rotating one of said members thereby driving the other member through the intermeshing engagement of the teeth of the two members, the axes of the gear member and cutter member being crossed at an angle of at least 3° and less than 30°, imparting relative traverse of one member relative to the other in a plane which is parallel to the axes of both so as to make at least two passes, at least the initial pass being made at a relatively high rate of feed and at least the final pass being made at a relatively low rate of feed, the ratio of the high rate of feed to the low rate of feed being of the order of between 1.25 and 3 to 1.

2. The method of shaving gears as claimed in claim 1, in which the direction of relative traverse of the intermeshing members is also parallel to the axis of the gear member.

3. The method of shaving gears as claimed in claim 1 in which the direction of relative traverse of the intermeshing members is inclined to the axis of the gear member.

4. The method of shaving gears as claimed in claim 1 in which incremental in-feed is applied between the gear member and the tool member at the end of at least the initial pass.

5. The method of shaving gear members as claimed in claim 1 in which only one pass of the gear member relative to the tool member is made at the relatively high rate of feed such pass being followed by a single final pass at the realtively low rate of feed.

6. The method of shaving gear members as claimed in claim 5 in which the final pass is effected without incremental in-feed between the gear and tool members.

7. The method of shaving gear members as claimed in claim 5 wherein the first pass is followed by a small incremental in-feed between the tool member and gear member.

8. The method of shaving gear members as claimed in claim 1 in which only one pass of the gear member relative to the tool member is made at the relatively high rate of feed followed by a plurality of passes at a relatively lower rate of feed without incremental in-feed between the gear member and tool member.

9. The method of shaving gear members as claimed in claim 1 in which a single pass or traverse is made at the relatively high rate of feed followed by at least one pass at a relatively lower rate of feed and accompanied with incremental in-feed between the tool member and gear member and thereafter at least one pass likewise at the lower rate of feed but within any incremental in-feed between the tool member and gear member.

10. The method of shaving gear members as claimed in claim 1 in which at least one initial pass of the gear member relative to the tool member is effected at a feed rate greater than the conventional feed rate of the order of 0.010" per revolution of the gear this feed rate being the rate of traverse of the crossed axis point along the axis of the gear member.

11. The method shaving gear members as claimed in claim 1 wherein a number of initial passes are made to produce a rate of feed of the crossed axes point along the axis of the gear member of between 0.013" and 0.030" per revolution of gear member and which passes are followed by at least one final pass at the lower feed rate such as to produce a feed of the crossed axis point along the gear member axis of between 0.005" and 0.013" per revolution of the gear.

12. The method of shaving gear members as claimed in claim 1 wherein a number of initial passes accompanied by in-feed are effected to produce a rate of feed of the crossed axes point along the axis of the gear member of between 0.015" and 0.025" per revolution of the gear member and are followed by at least one pass at the lower rate of feed and with a relatively small amount of incremental feed of the gear member relative to the tool member and at least one final pass likewise at the lower rate of feed with no incremental feed, such lower rates of feed being between 0.005" and 0.015" per revolution of the gear.

13. The method of shaving gear members as claimed in claim 1 wherein four passes accompanied with in-feed are effected at a feed rate of the order of 0.018" per revolution of the gear, said passes being followed by two finishing passes executed without incremental in-feed of the gear member relative to the tool member and at a lower feed rate of the order of 0.010" per revolution of the gear, the rate of feed being that of the travel of the point of crossed axes along the axis of the gear member.

14. The method of shaving gear members as claimed in claim 1 wherein the gear member is finished in four passes, the first two passes being accompanied with incremental in-feed of the gear member relative to the tool member and at the higher rate of feed, the third pass with a similar incremental in-feed of the gear member relative to the tool member and the fourth pass without incremental in-feed, the third and fourth passes being effected at a realtively low rate of feed.

References Cited in the file of this patent

UNITED STATES PATENTS

| | | |
|---|---|---|
| 2,565,883 | Praeg et al. | Aug. 28, 1951 |
| 2,581,700 | Praeg | Jan. 8, 1952 |
| 2,612,080 | Davis | Sept. 30, 1952 |
| 2,635,507 | Praeg | Apr. 21, 1953 |
| 2,669,905 | Miller | Feb. 23, 1954 |
| 2,696,762 | Miller | Dec. 14, 1954 |
| 2,887,014 | Praeg et al. | May 19, 1959 |
| 2,887,015 | McNabb | May 19, 1959 |